US 12,505,166 B2

United States Patent
Dar et al.

(10) Patent No.: US 12,505,166 B2
(45) Date of Patent: Dec. 23, 2025

(54) SYSTEM AND METHOD FOR GENERATING OPTIMIZED CHUNKS FOR RETRIEVAL AUGMENTED GENERATION USING DOCUMENT HIERARCHY

(71) Applicant: Dell Products L.P., Round Rock, TX (US)

(72) Inventors: Shaul Dar, Petach Tikva (IL); Ramakanth Kanagovi, Hyderabad (IN); Guhesh Swaminathan, Tamil Nadu (IN); Rajan Kumar, Nawada (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/628,934

(22) Filed: Apr. 8, 2024

(65) Prior Publication Data

US 2025/0315486 A1    Oct. 9, 2025

(51) Int. Cl.
*G06F 16/93* (2019.01)
*G06F 16/901* (2019.01)
*G06F 16/903* (2019.01)

(52) U.S. Cl.
CPC ......... *G06F 16/93* (2019.01); *G06F 16/9027* (2019.01); *G06F 16/90335* (2019.01)

(58) Field of Classification Search
CPC ............ G06F 16/93; G06F 16/90335; G06F 16/9027; G06F 16/3329; G06F 16/3334; G06F 16/3347; G06F 16/90332; G06F 30/27; G06F 40/20; G06F 40/56
See application file for complete search history.

(56) References Cited

U.S. PATENT DOCUMENTS

2024/0354436 A1*  10/2024  Mukherjee .......... G06F 16/3344
2025/0005300 A1*   1/2025  O'Kelly .............. G06F 40/205

* cited by examiner

*Primary Examiner* — Hau H Hoang
(74) *Attorney, Agent, or Firm* — Brian J. Colandreo; Heath M. Sargeant; Holland & Knight LLP

(57) ABSTRACT

A method, computer program product, and computing system for identifying a plurality of headings from a document by processing a hierarchical structure associated with the document including the plurality of headings and a plurality of content portions within the plurality of headings. A plurality of respective chunks are generated using the plurality of headings and a prompt size limitation associated with a prompt of a generative artificial intelligence (AI) model. The plurality of respective chunks are provided for generating a prompt for the generative AI model.

17 Claims, 6 Drawing Sheets

SYSTEM AND METHOD FOR GENERATING OPTIMIZED CHUNKS FOR RETRIEVAL AUGMENTED GENERATION USING DOCUMENT HIERARCHY

BACKGROUND

Generative artificial intelligence (AI) models, such as Large Language Model (LLMs) s have recently proven to be a better alternative to traditional search engines, helping users find pieces of information they are looking for, and able to provide more concise and relevant answers, albeit with a risk that the answers may be irrelevant or incorrect.

In some instances, the query that a user types is given as input to the LLM, along an appropriate context, which is the text that the LLM should "search" for in an answer, a technique that is called prompt engineering. The main problem with this approach is that the size of the prompt is limited. For example, the limit for GPT3.5-Turbo is 4,096 tokens, the limit for GPT4 is 8,192 tokens, and the limit for GPT-4-32k is 32,768 tokens. Documents or other content that can be searched using the LLM are often orders of magnitude larger than the prompt size limit. For example, the size of a single example storage system user guide is twenty megabytes, and the size of the complete set of relevant installation documents and knowledge base articles ranges between hundreds of megabytes to hundreds of gigabytes. Accordingly, Retrieval Augmented Generation (RAG) is used to break input documents into chunks that are small enough to fit the prompt size limitations. It then uses common indexing and retrieval techniques to match user queries to the most relevant content chunks, and then combines the user query and context (one or more chunks) as a prompt to the LLM and presents the answers to the user.

Common approaches for forming these chunks include chunking input documents successively, taking each time as many characters as possible without exceeding the prompt size limitations. A variation allows for overlapping chunks to handle cases where the answers to some queries span multiple consecutive sections. These chunking methods can lead to low quality matches between the user query and input chunks, irrelevant or incorrect results returned from the LLM, and an overall negative user experience with the LLM.

SUMMARY OF DISCLOSURE

In one example implementation, a computer-implemented method executed on a computing device may include, but is not limited to, identifying a plurality of headings from a document by processing a hierarchical structure associated with the document including the plurality of headings and a plurality of content portions within the plurality of headings. A plurality of respective chunks are generated using the plurality of headings and a prompt size limitation associated with a prompt of a generative artificial intelligence (AI) model. The plurality of respective chunks are provided for generating a prompt for the generative AI model.

One or more of the following example features may be included. The hierarchical structure associated with the document may be a Document Object Model (DOM) associated with the document. Generating the plurality of respective chunks may include determining an average size associated with a plurality of heading levels for the plurality of headings; and generating the plurality of respective chunks using a heading level with an average size that is below the prompt size limitation associated with the prompt. Generating the plurality of respective chunks may include generating a first subset of respective chunks from the plurality of headings; and generating a second subset of respective chunks from a respective heading and a content portion within the respective heading. Generating the plurality of respective chunks may include generating a markdown representation for each respective chunk including hierarchical context associated with the respective heading. Generating the plurality of respective chunks may include generating a plurality of respective chunk embeddings from the plurality of respective chunks. A query embedding is generated from the query. A similar chunk embedding is identified by determining a similarity between the query embedding and the plurality of respective chunk embeddings. A prompt is generated using the query embedding and the similar chunk embedding. The prompt is provided to the generative AI model.

In another example implementation, a computer program product resides on a computer readable medium that has a plurality of instructions stored on it. When executed by a processor, the instructions cause the processor to perform operations that may include, but are not limited to, identifying a plurality of headings from a document by processing a hierarchical structure associated with the document including the plurality of headings and a plurality of content portions within the plurality of headings. A plurality of respective chunks are generated using the plurality of headings and a prompt size limitation associated with a prompt of a generative artificial intelligence (AI) model. The plurality of respective chunks are provided for generating a prompt during retrieval augmented generation (RAG) using the generative AI model.

One or more of the following example features may be included. The hierarchical structure associated with the document may be a Document Object Model (DOM) associated with the document. Generating the plurality of respective chunks may include determining an average size associated with a plurality of heading levels for the plurality of headings; and generating the plurality of respective chunks using a heading level with an average size that is below the prompt size limitation associated with the prompt. Generating the plurality of respective chunks may include generating a first subset of respective chunks from the plurality of headings; and generating a second subset of respective chunks from a respective heading and a content portion within the respective heading. Generating the plurality of respective chunks may include generating a markdown representation for each respective chunk including hierarchical context associated with the respective heading. Generating the plurality of respective chunks may include generating a plurality of respective chunk embeddings from the plurality of respective chunks. A query embedding is generated from the query. A similar chunk embedding is identified by determining a similarity between the query embedding and the plurality of respective chunk embeddings. A prompt is generated using the query embedding and the similar chunk embedding. The prompt is provided to the generative AI model.

In another example implementation, a computing system includes at least one processor and at least one memory architecture coupled with the at least one processor, wherein the at least one processor is configured to identify a plurality of headings from a document by processing a hierarchical structure associated with the document including the plurality of headings and a plurality of content portions within the plurality of headings. A plurality of respective chunks are generated using the plurality of headings and a prompt size limitation associated with a prompt of a generative artificial intelligence (AI) model. The plurality of respective chunks are provided for generating a prompt during retrieval augmented generation (RAG) using the generative AI model.

One or more of the following example features may be included. The hierarchical structure associated with the document may be a Document Object Model (DOM) associated with the document. Generating the plurality of respective chunks may include determining an average size associated with a plurality of heading levels for the plurality of headings; and generating the plurality of respective chunks using a heading level with an average size that is below the prompt size limitation associated with the prompt. Generating the plurality of respective chunks may include generating a first subset of respective chunks from the plurality of headings; and generating a second subset of respective chunks from a respective heading and a content portion within the respective heading. Generating the plurality of respective chunks may include generating a markdown representation for each respective chunk including hierarchical context associated with the respective heading. Generating the plurality of respective chunks may include generating a plurality of respective chunk embeddings from the plurality of respective chunks. A query embedding is generated from the query. A similar chunk embedding is identified by determining a similarity between the query embedding and the plurality of respective chunk embeddings. A prompt is generated using the query embedding and the similar chunk embedding. The prompt is provided to the generative AI model.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
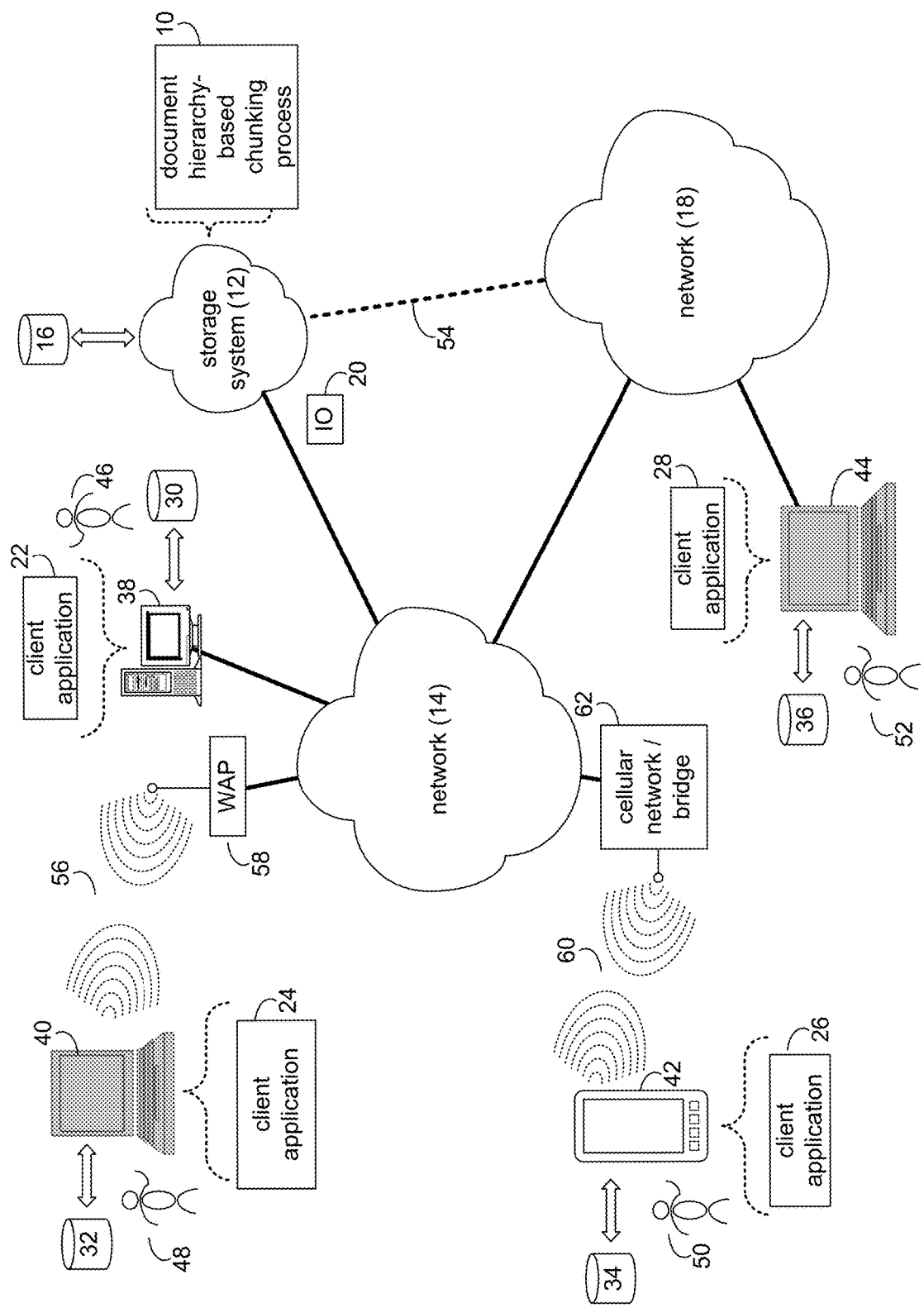
FIG. 1 is an example diagrammatic view of a storage system and a document hierarchy-based chunking process coupled to a distributed computing network according to one or more example implementations of the disclosure.

System Overview:

Referring to FIG. 1, there is shown document hierarchy-based chunking process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of document hierarchy-based chunking process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of document hierarchy-based chunking process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a document hierarchy-based chunking process, such as document hierarchy-based chunking process 10 of FIG. 1, may include but is not limited to, identifying a plurality of headings from a document by processing a hierarchical structure associated with the document including the plurality of headings and a plurality of content portions within the plurality of headings. A plurality of respective chunks are generated using the plurality of headings and a prompt size limitation associated with a prompt of a generative artificial intelligence (AI) model. The plurality of respective chunks are provided for generating a prompt for the generative AI model.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
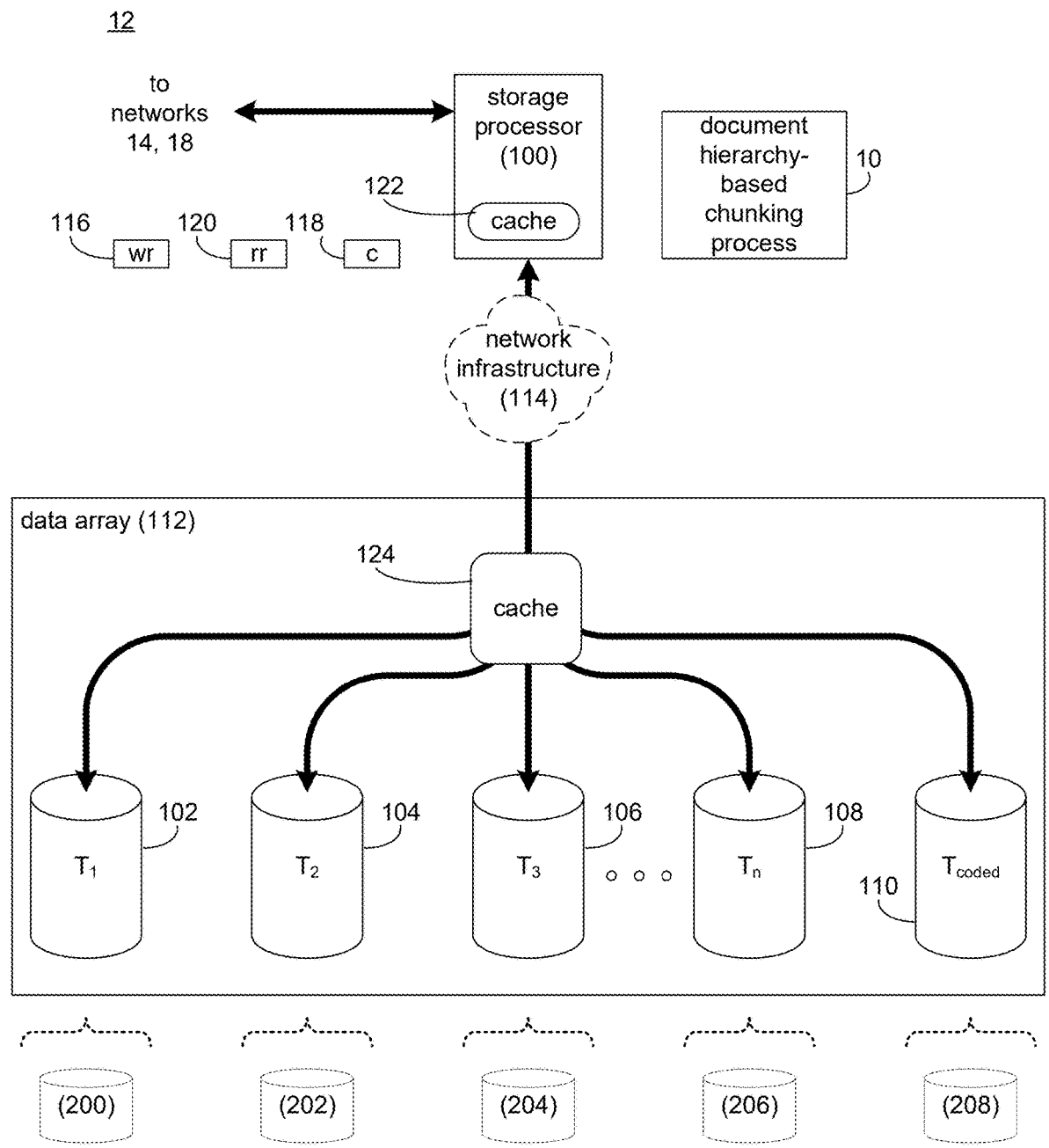
FIG. 2 is an example diagrammatic view of the storage system of FIG. 1 according to one or more example implementations of the disclosure.
Figure 3:
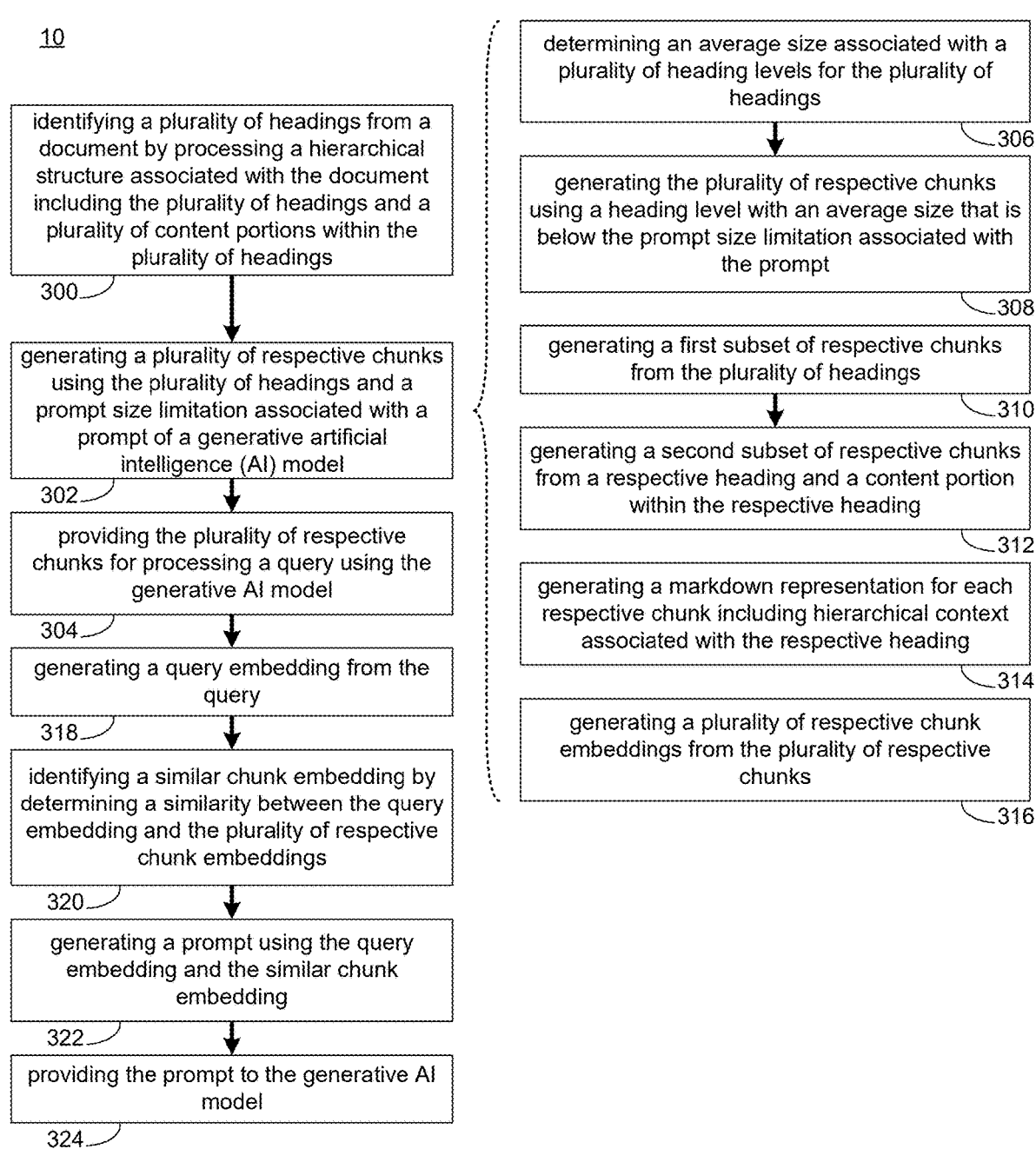
FIG. 3 is an example flowchart of document hierarchy-based chunking process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of document hierarchy-based chunking process 10. The instruction sets and subroutines of document hierarchy-based chunking process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of document hierarchy-based chunking process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of document hierarchy-based chunking process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of document hierarchy-based chunking process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Document Hierarchy-Based Chunking Process:

Referring also to the examples of FIGS. 3-6 and in some implementations, document hierarchy-based chunking process 10 may identify 300 a plurality of headings from a document by processing a hierarchical structure associated with the document including the plurality of headings and a plurality of content portions within the plurality of headings. A plurality of respective chunks are generated 302 using the plurality of headings and a prompt size limitation associated with a prompt of a generative artificial intelligence (AI) model. The plurality of respective chunks are provided 304 for generating a prompt for the generative AI model.

As will be discussed in greater detail below, implementations of the present disclosure may allow for optimized chunking of input documents to enhance RAG performance with a generative AI model. For example and as described above, one of the primary challenges with RAG is how to perform the chunking of input documents effectively. A common approach is to chunk input documents successively, taking each time as many characters as possible without exceeding the prompt size limitations. Another approach allows for overlapping chunks to handle cases where the answers to some queries span multiple consecutive sections. However, these chunking methods can lead to low quality matches between the user query and input chunks, irrelevant or incorrect results returned from the LLM, and an overall negative or poor user experience. Implementations of the present disclosure provide more effective approach based on comprehension of the input document's hierarchical structure (e.g., a document object model (DOM)). As will be described in greater detail below, implementation of the present disclosure can improve the relevance of the chunks and the match between the queries and the chunks, and, as such, the overall quality of the question-answering process and user satisfaction. Additional enhancements are described that generate chunks that represent hierarchical subsets of the information, in order to "pack" more relevant and concise information at a lower cost (in terms of size).

Figure 4:
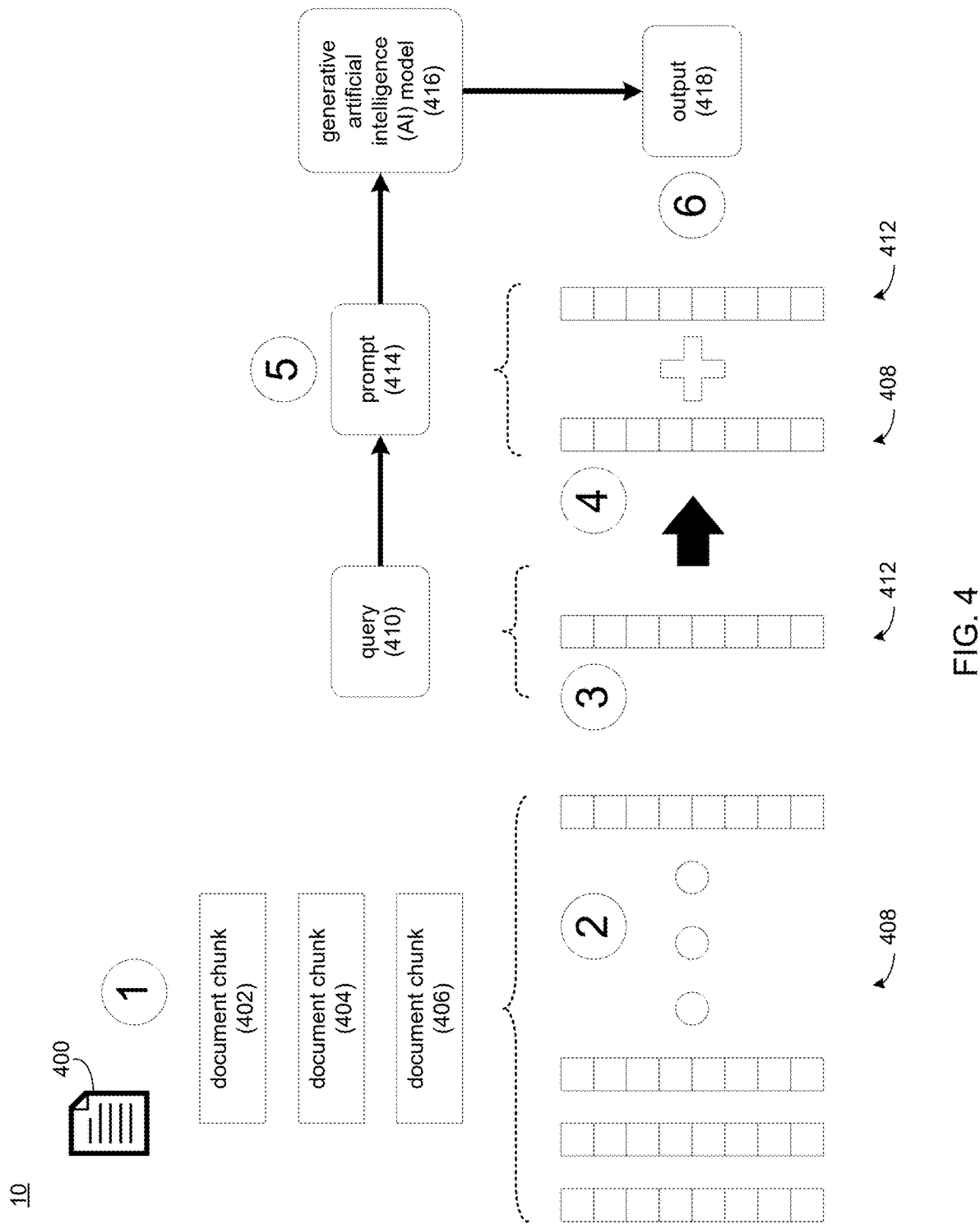
FIG. 4 is an example diagrammatic view of a retrieval augmented generation (RAG) process according to one or more example implementations of the disclosure.

Referring also to FIG. 4 and as will be discussed in greater detail below, document hierarchy-based chunking process 10 provides 304 a plurality of respective chunks generated using a plurality of headings and a prompt size limitation associated with a prompt of a generative artificial intelligence (AI) model for use during retrieval augmented generation (RAG). In some implementations, document hierarchy-based chunking process 10 is a preprocessing phase of RAG used to prepare chunk embeddings for use during RAG to generate prompts. As shown in FIG. 4 and when preparing an input document for retrieval augmented generation (RAG), document hierarchy-based chunking process 10 processes a collection of input documents (e.g., document 400) and breaking each input document into chunks (e.g., document chunks 402, 404, 406). This is shown as action "1".

Document hierarchy-based chunking process 10 indexes each chunk using word embeddings. For example, the Bidirectional Encoder Representations from Transformers (BERT) sentence transformer uses a space of 384 embeddings. In this example, each chunk of text is passed through the transformer, and a vector of 384 numbers corresponding to the 384 dimensions is outputted. The resulting content chunks and their vector embeddings (e.g., chunk embeddings 408) are stored in a database. This is shown as action "2" which completes the preprocessing of input documents for use during RAG.

Given a user query (e.g., query 410), the query text is likewise transformed into a vector of embeddings (e.g., query embedding 412). This is shown as action "3". The similarity between the query and chunks is determined to find a small set of chunks that are most similar (i.e., relevant) to the query. This is done using cosine similarity or a similar algorithm. As will be described in greater detail below, this matching step can be done efficiently using vector search. This is shown as action "4".

The query and selected chunks are combined into a prompt (e.g., prompt 414) to the LLM (e.g., generative artificial intelligence (AI) model 416). This is shown as action "5". The LLM output (e.g., output 418) is presented to the user. This is shown as action "6". Accordingly, document hierarchy-based chunking process 10 enhances the preprocessing of input documents by generating chunks and respective chunk embeddings using the input document's hierarchical structure to guide chunk generation.

In some implementations, document hierarchy-based chunking process 10 identifies 300 a plurality of headings from a document by processing a hierarchical structure associated with the document including the plurality of headings and a plurality of content portions within the plurality of headings. For example and referring also to FIG. 5, a document (e.g., document 400) may generally include a plurality of headings (e.g., headings 500, 502, 504, 506, 508, 510) and associated content portions (e.g., content portions 512, 514, 516, 518, 520, 522). In this example, heading 500 includes sub headings 502, 504 and sub heading 502 includes sub sub heading 506 and sub heading 504 includes sub sub heading 508 and sub sub heading 510. Further, content portion 512 corresponds to heading 500; content portion 514 corresponds to sub heading 502; content portion 516 corresponds to sub heading 504; content portion 518 corresponds to sub sub heading 518; content portion 520 corresponds to sub sub heading 508; and content portion 522 corresponds to sub sub heading 510. In this example, the hierarchical structure is defined using headings, sub headings, sub sub headings, and corresponding content portions. However, it will be appreciated that other hierarchical relationships and dependencies may be used to define a hierarchical structure for document 400 within the scope of the present disclosure.

In some implementations, processing the hierarchical structure associated with the document includes identifying structural elements within the document indicative of hierarchical structure. For example, document hierarchy-based chunking process 10 may identify headings by identifying changes in font style and/or size from general text portions. In another example, document hierarchy-based chunking process 10 may identify headings by identifying spacing or text indentation within the document that are indicative of hierarchical structure. In another example, document hierarchy-based chunking process 10 may identify hierarchical indicators in the form of list numbering, paragraph numbering, evidence of multilevel lists, an alphanumerical character followed by a parenthesis (i.e., ")") or a period (i.e., ".") as in "2." or "3)", etc. In this example, document hierarchy-based chunking process 10 uses text recognition to identify these characters and their structural and spatial relationship to identify 300 headings in the document.

Figure 5:
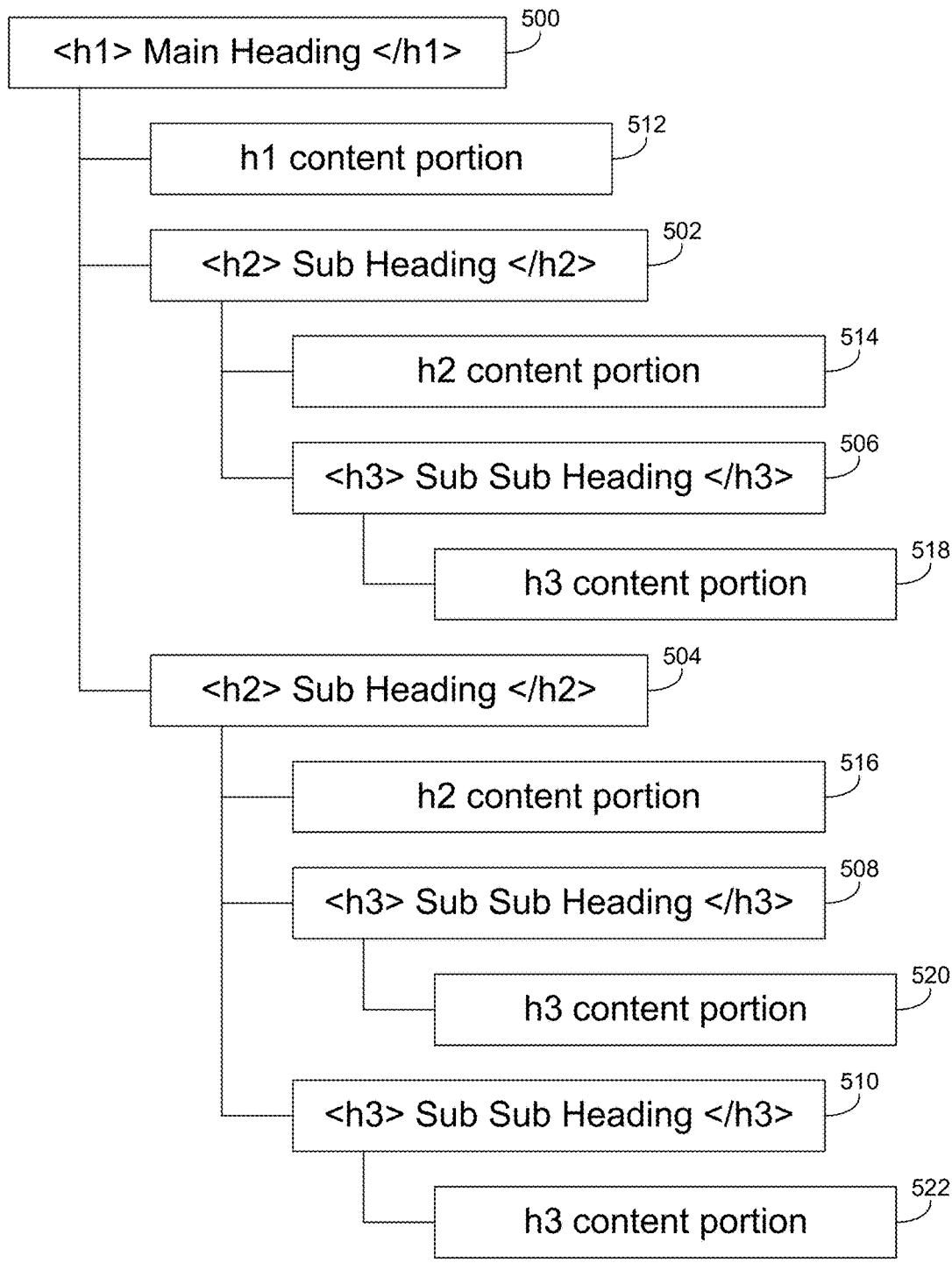
FIGS. 5-6 are example diagrammatic views of the document hierarchy-based chunking process according to various example implementations of the disclosure.
Figure 6:
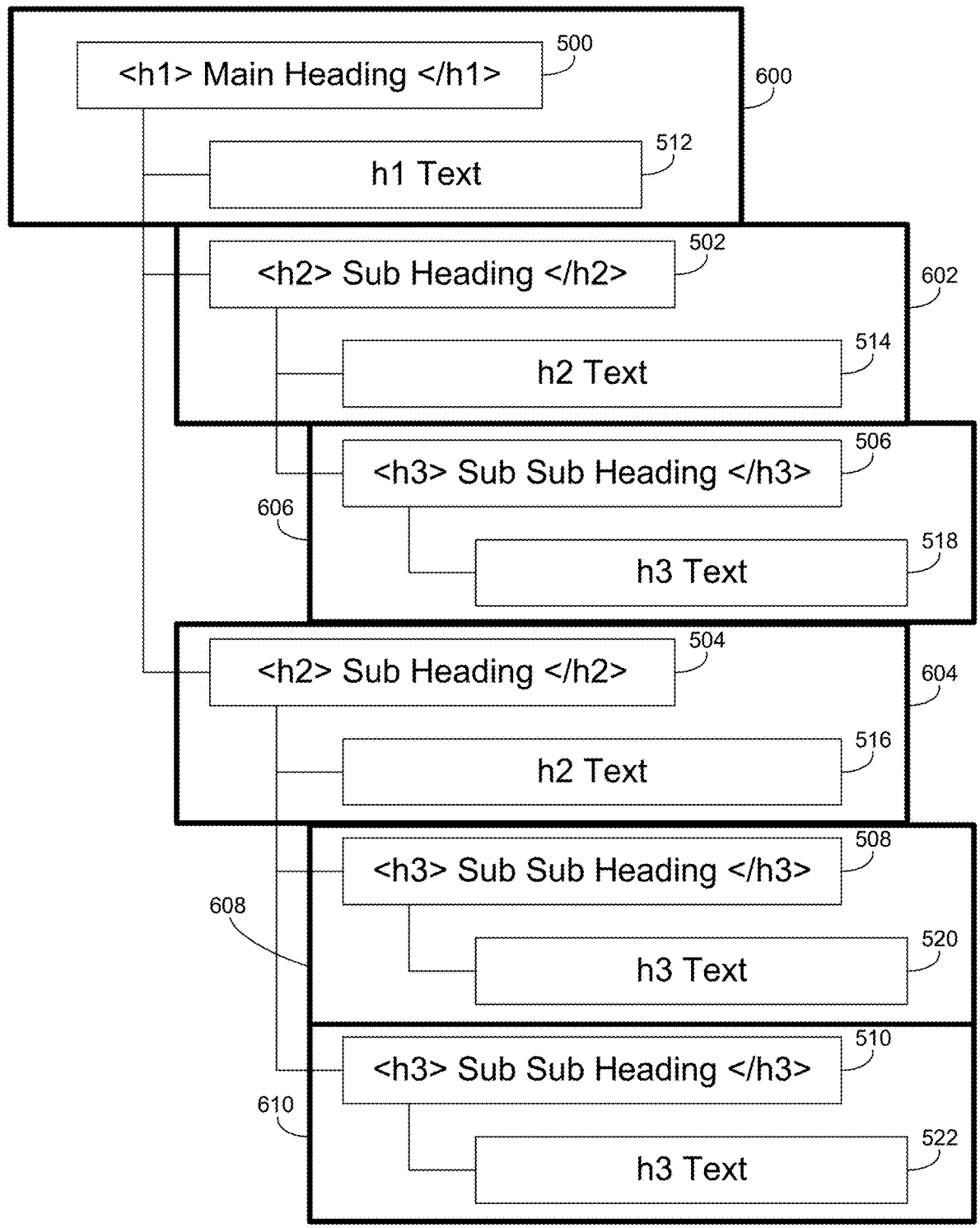

In some implementations, the hierarchical structure associated with the document is a Document Object Model (DOM) associated with the document. For example, a Document Object Model (DOM) is a standard representation of a document as a logical tree structure, as shown informally in the example in FIG. 5. It will be appreciated that FIG. 5 is a simplified block diagram of the logical tree structure that where many details such as the actual text, formatting, links, etc. are omitted for clarity. In some implementations, document hierarchy-based chunking process 10 accesses an application programming interface (API) that provides programmatic access to the DOM associated with the document (e.g., the tree structure and elements defined in the DOM for the document). In some examples, the document may be defined using HyperText Markup Language (HTML) or Extensible Markup Language (XML). In other examples, the document is a Portable Document Format (PDF) or other text document that is converted to a DOM representation from which document hierarchy-based chunking process 10 identifies 300 a hierarchical structure for generating chunks for use during RAG.

In some implementations, document hierarchy-based chunking process 10 generates 302 a plurality of respective chunks using the plurality of headings and a prompt size limitation associated with a prompt of a generative artificial intelligence (AI) model. A chunk is a discrete portion of the document that is used to generate a chunk embedding for combination with a query embedding to provide content in a prompt provided to a generative AI model during RAG. Generating 302 the plurality of respective chunks includes generating an index or indexes for searching during query processing. As such, each generated chunk may be stored in a database or other data structure as an index. In some implementations, a generative AI model (e.g., generative AI model 416) is a type of artificial intelligence system that is capable of generating new data samples that are similar to the training data it has been trained with. These models generally work by learning the underlying patterns and structures present in the training data and then using this "knowledge", they generate new, consistent examples.

In some implementations, the generative AI model includes a Large Language Model (LLM). A LLM (e.g., GPT-4 from OpenAIR, OpenLLaMa, and Cerebras-GPT) is a language model consisting of a neural network with many parameters (typically billions of weights or more), trained on large quantities of unlabeled text using self-supervised learning or semi-supervised learning. Though trained on simple tasks along the lines of predicting the next word in a sentence, LLMs with sufficient training and parameter counts capture the syntax and semantics of human language. In some implementations, the generative AI model includes a natural language processing (NLP) model. An NLP model (e.g., XLNet, Robustly Optimized Bidirectional Encoder Representations from Transformers Pretraining Approach (ROBERTa), and Pathways Language Model (PaLM)) is a model that concerns the understanding, analysis, and generation of natural language. NLP models analyze text and speech to extract meaning, as well as generating new text or speech in response.

As discussed above, many generative AI models, such as LLMs, are not trained on a particular library of input documents used for a particular scenario. As such, these generative AI models lack the context to process content from the particular library of input documents. Accordingly, the process of Retrieval Augmented Generation (RAG) is used to break the relevant input documents into chunks that are small enough to fit prompt size limitations associated with the generative AI model. Document hierarchy-based chunking process 10 uses common indexing and retrieval techniques to match user queries to the most relevant content chunks, and then combines the user query and context (one or more chunks) as a prompt to the generative AI model and presents the answer(s) to the user.

As discussed above, conventional approaches for generating chunks read as many characters as possible into each chunk according to prompt size limitations (an approach referred to as "force feeding the prompt"). In contrast, document hierarchy-based chunking process 10 uses the hierarchical structure (e.g., the DOM structure) to guide the steps of chunk creation, chunk indexing and matching queries with chunks.

In some implementations, generating 302 the plurality of respective chunks includes determining 306 an average size associated with a plurality of heading levels for the plurality of headings and generating 308 the plurality of respective chunks using a heading level with an average size that is below the prompt size limitation associated with the prompt. Prompts for a generative AI model are generally limited by a predefined prompt size limitation specific to each generative AI model. For example, the limit for the GPT3.5-Turbo generative AI model is 4,096 tokens, the limit for GPT4 generative AI model is 8,192 tokens, and the limit for GPT-4-32k generative AI model is 32,768 tokens.

In one example, document hierarchy-based chunking process 10 generates chunks based on the highest level of headings that can fit into the prompt. In this example, document hierarchy-based chunking process 10 determines 306 an average size associated with each heading level. Returning to the example of FIG. 5, document hierarchy-based chunking process 10 determines 306 an average size for the main heading (e.g., heading 500) with it's associated content portions (e.g., content portion 512) and sub headings (e.g., headings 502, 504). In this example, heading 500 includes all of the sub headings and content portion shown in FIG. 5. Document hierarchy-based chunking process 10 determines 306 the average size for each sub heading (e.g., headings 502, 504) with their associated content portions (e.g., content portions 514, 516) and sub sub headings (e.g., headings 506, 508, 510). In this example, heading 502 includes content portion 514, heading 506 and content portion 518 associated with heading 506; and heading 504 includes content portion 516, heading 508, content portion 520 associated with heading 508, heading 510, and content portion 522 associated with heading 510. As such, the average size for this second level of headings is the average of the size of heading 502 and the size of heading 504 as described above. Document hierarchy-based chunking process 10 determines 306 the average size for each sub sub heading (e.g., headings 506, 508, 510) with their associated content portions (e.g., content portions 518, 520, 522). As such, the average size for this third level of headings is the average of the size of heading 506, the size of heading 508, and the size of heading 510 (with their respective content portions (e.g., content portions 518, 520, 522, respectively)). An example of the average word sizes for each heading level as shown in FIG. 5 is shown below in Table 1 for an example document:

TABLE 1

| Headings | Min Word Count | Max Word Count | Average Word Count |
|---|---|---|---|
| H1 | 4,375 | 12,030 | 6,733 |
| H2 | 171 | 4,217 | 1,931 |
| H3 | 40 | 501 | 112 |

Using the example of GPT3.5-Turbo with a prompt size limitation of 4,096 tokens, the first level headings/sections (e.g., H1 sections) are usually be too large, most second level headings/sections (e.g., H2 sections) were below the prompt size limitation, but some are too large, and the maximum size of the third level headings/sections (e.g., H3 sections) fit under the size limit. Accordingly, document hierarchy-based chunking process 10 generates 308 the plurality of respective chunks using a heading level with an average size (e.g., headings 506, 508, 510) that is below the prompt size limitation associated with the prompt (e.g., 4,096 tokens). In this example, the content portions of the third heading level provide the best context for the most queries (i.e., where the chunks include all the relevant text required to answer the query).

In some implementations, generating 302 the plurality of respective chunks includes generating 310 a first subset of respective chunks from the plurality of headings and generating 312 a second subset of respective chunks from a respective heading and a content portion within the respective heading. For example, document hierarchy-based chunking process 10 can apply a two-phased approach for chunk vector embeddings and indexing by 1) generating 310 chunks for just the headings (e.g., a first subset of respective chunks) in a "headings-only" index. This creates very small and specific chunks. In this example, first subset of chunks includes a chunk for heading 500; a chunk for heading 502; a chunk for heading 504; a chunk for heading 506; and chunk for heading 508; and a chunk for heading 510. Each of these chunks does not include the corresponding content portions. Document hierarchy-based chunking process 10 then generates 312 a second subset of chunks that includes each heading along with the content portion directly below the heading (i.e., up to the next heading level, or in case of a leaf node the entire section content portion), as indicated by the second subsets shown in FIG. 6 (e.g., second subset of respective chunks 600, 602, 604, 606, 608, 610) in a "headings and content" index. In this example, second subset of respective chunks where chunk 600 includes heading 500 and content portion 512; chunk 602 includes heading 502 and content portion 514; chunk 604 includes heading 504 and content portion 516; chunk 606 includes heading 506 and content portion 518; chunk 608 includes heading 508 and content portion 520; and chunk 610 includes heading 510 and content portion 522.

In some implementations, document hierarchy-based chunking process 10 generates 314 a markdown representation for each respective chunk including hierarchical context associated with the respective heading. For example, a markdown representation is a description of the hierarchical context for headings within the hierarchical structure. In some implementations, document hierarchy-based chunking process 10 uses the markdown representation for the matching phase (i.e., when processing a query to identify a chunk embedding to use for prompt generation). In one example, document hierarchy-based chunking process 10 generates a markdown representation for a third level heading (e.g., heading 506) as <"heading 500 . . . heading 502 . . . heading 506"> where the hierarchical location of heading 506 is shown relative to heading 500 and heading 502.

As will be discussed in greater detail below, when matching a query with the document chunks, document hierarchy-based chunking process 10 first searches the "headings-only" index. If no sufficiently similar answers are found (i.e., no answers above some threshold in the similarity search) document hierarchy-based chunking process 10 then searches the "headings and content" index. This approach allows document hierarchy-based chunking process 10 to find better and more concise answers when they are available.

In some implementations, document hierarchy-based chunking process 10 generates 316 a plurality of respective chunk embeddings from the plurality of respective chunks. Referring again to FIG. 4, document hierarchy-based chunking process 10 generates 302 a plurality of respective chunks as described above (e.g., document chunks 402, 404, 406) from document 400 using the hierarchical structure of document 400 (as shown in FIG. 5). Accordingly, document hierarchy-based chunking process 10 generates a plurality of respective chunk embeddings (e.g., chunk embeddings 408) from the plurality of respective chunks (e.g., document chunks 402, 404, 406) by converting each document chunk into a vector of embeddings. In some implementations, generating 316 a respective chunk embedding includes passing each chunk of content (i.e., text) through a transformer, and a vector of numbers corresponding to the dimensions for the vector embedding is outputted. The resulting content chunks and their vector embeddings (e.g., chunk embeddings 408) are stored in a database. This process of generating 316 the plurality of respective chunk embeddings is also known as indexing.

In some implementations, document hierarchy-based chunking process 10 provides 304 the plurality of respective chunks for processing a query using the generative AI model. For example, using the plurality of respective chunks, document hierarchy-based chunking process 10 is able to process queries using generative AI model 416 using context from document 400. In some implementations, document hierarchy-based chunking process 10 uses plurality of respective chunks 408 during retrieval augmented generation (RAG) using generative AI model 416. For instance, with plurality of respective chunks 408 generated from hierarchical structure of document 400, document hierarchy-based chunking process 10 provides more efficient (i.e., in terms of chunk size) and effective (i.e., in terms of connecting related concepts hierarchically) representations of document 400 for processing prompts with generative AI model 416. In the following example, a query (e.g., query 410) is received for processing using generative AI model 416. In this example, a standard RAG approach is compared with document hierarchy-based chunking process 10. For example, consider a query (e.g., "How to unpack the base enclosure?") based on document 400 which is an installation and service guide for a storage system. Using the conventional standard RAG approach, a prompt is generated using standardized chunks as follows:

---

Query: How to unpack the base enclosure?
Output: To unpack the base enclosure, first pull the inner rails out of the rack until they lock into place. Then release the inner rail lock by pulling forward on the orange tabs and sliding the inner rail out of the intermediate rails until they are fully extended. Next, attach the inner rails to the sides of the system by aligning the J-slots on the rail with the standoffs on the system and sliding forward on the system until they lock into place. After that, with the intermediate rails extended, install the system into the extended rails. Pull the orange slide release lock tabs forward on both the rails, and slide the system into the rack. Finally, install the lower cable management arm by aligning the two retention latches with the two lower rail cable clips, and inserting them into the clips until you feel and hear an audible click.

---

In the above example, this list is part of a section concerning how to "install the system in the cabinet" within a chapter explaining how to "Add an NVMe expansion enclosure" which is different than the based enclosure. This is likely because a search of the query in the reference document produces no match. However, a slight modification of the query (i.e., "unpack the base enclosure") results in a single match, which provides the correct information.

Now using document hierarchy-based chunking process 10, document hierarchy-based chunking process 10 generates 318 a query embedding (e.g., query embedding 412) from query 410. Document hierarchy-based chunking process 10 identifies 320 a similar chunk embedding by determining a similarity between query embedding 412 and plurality of respective chunk embeddings 408. In some implementations, the similarity is determined by calculating a cosine similarity between query embedding 412 and plurality of respective chunk embeddings 408. However, it will be appreciated that other comparison algorithms may be used to identify a sufficiently similar respective chunk embedding from plurality of respective chunk embeddings 408 compared to query embedding 412. In some implementations, document hierarchy-based chunking process 10 uses a similarity threshold for comparing query embedding 412 and plurality of respective chunk embeddings 408.

In some implementations, document hierarchy-based chunking process 10 generates 322 a prompt using the query embedding and the similar chunk embedding. For example, document hierarchy-based chunking process 10 combines query embedding 412 and the similar respective chunk embeddings from plurality of respective chunk embeddings 408 to generate prompt 414. As discussed above, the combined prompt is generated using the prompt size limitation for generative AI model 416. In some implementations, document hierarchy-based chunking process 10 provides 324 the prompt to the generative AI model. Generative AI model 416 processes prompt 414 to generate an output (e.g., output 418). In this example, generative AI model 416 generates output 418 as shown below:

---

Query: How to unpack the base enclosure?
Output: To unpack the base enclosure, first verify that all of the components in the shipping package have been received. This includes the base enclosure (a 2U component with 25 2.5" drive slots), the tool-less rail
kit, power cords, and the bezel. Before installing the base enclosure, ensure that the hardware has acclimated to the operation environment as described in the Hardware acclimation times.

---

As shown above, the standard RAG approach generates a prompt with a prompt size of 870 tokens while the prompt generated by document hierarchy-based chunking process 10 has a prompt size of only 132 tokens. In this example, document hierarchy-based chunking process 10 generates a prompt with a significantly reduced prompt size. Accordingly, the processing cost (in terms of computing resources required and financial cost) for the prompt is reduced compared to standard RAG approaches.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   identifying a plurality of headings from a document by processing a hierarchical structure associated with the document including the plurality of headings and a plurality of content portions within the plurality of headings;
   generating a plurality of respective chunks using the plurality of headings and a prompt size limitation associated with a prompt of a generative artificial intelligence (AI) model, wherein generating a plurality of respective chunks includes generating a first subset of respective chunks from the plurality of headings and generating a second subset of respective chunks from a combination of both a respective heading and a content portion within the respective heading; and
   providing the plurality of respective chunks for processing a query using the generative AI model.

2. The computer-implemented method of claim 1, wherein the hierarchical structure associated with the document is a Document Object Model (DOM) associated with the document.

3. The computer-implemented method of claim 1, wherein generating the plurality of respective chunks includes:
   determining an average size associated with a plurality of heading levels for the plurality of headings; and
   generating the plurality of respective chunks using a heading level with an average size that is below the prompt size limitation associated with the prompt.

4. The computer-implemented method of claim 1, wherein generating the plurality of respective chunks includes:
   generating a markdown representation for each respective chunk including hierarchical context associated with the respective heading.

5. The computer-implemented method of claim 1, wherein generating the plurality of respective chunks includes:
   generating a plurality of respective chunk embeddings from the plurality of respective chunks.

6. The computer-implemented method of claim 1, further comprising:
   generating a query embedding from the query;
   identifying a similar chunk embedding by determining a similarity between the query embedding and the plurality of respective chunk embeddings;
   generating a prompt using the query embedding and the similar chunk embedding; and
   providing the prompt to the generative AI model.

7. A non-transitory computer program product residing on a non-transitory computer readable medium having a plurality of instructions stored thereon which, when executed by a processor, cause the processor to perform operations comprising:
   identifying a plurality of headings from a document by processing a hierarchical structure associated with the document including the plurality of headings and a plurality of content portions within the plurality of headings;
   generating a plurality of respective chunks using the plurality of headings and a prompt size limitation associated with a prompt of a generative artificial intelligence (AI) model, wherein generating a plurality of respective chunks includes generating a first subset of respective chunks from the plurality of headings and generating a second subset of respective chunks from a combination of both a respective heading and a content portion within the respective heading; and
   providing the plurality of respective chunks for generating a prompt during retrieval augmented generation (RAG) using the generative AI model.

8. The computer program product of claim 7, wherein the hierarchical structure associated with the document is a Document Object Model (DOM) associated with the document.

9. The computer program product of claim 7, wherein generating the plurality of respective chunks includes:
   determining an average size associated with a plurality of heading levels for the plurality of headings; and
   generating the plurality of respective chunks using a heading level with an average size that is below the prompt size limitation associated with the prompt.

10. The computer program product of claim 7, wherein generating the plurality of respective chunks includes:
    generating a markdown representation for each respective chunk including hierarchical context associated with the respective heading.

11. The computer-implemented method of claim 1, wherein generating the plurality of respective chunks includes:
    generating a plurality of respective chunk embeddings from the plurality of respective chunks.

12. The computer program product of claim 7, wherein the operations further comprise:
    generating a query embedding from a query;
    identifying a similar chunk embedding by determining a similarity between the query embedding and the plurality of respective chunk embeddings;
    generating a prompt using the query embedding and the similar chunk embedding; and
    providing the prompt to the generative AI model.

13. A computing system comprising:
    a memory; and
    a processor configured to identify a plurality of headings from a document by processing a hierarchical structure associated with the document including the plurality of headings and a plurality of content portions within the plurality of headings, wherein the processor is further configured to generate a plurality of respective chunks using the plurality of headings and a prompt size limitation associated with a prompt of a generative artificial intelligence (AI) model, wherein generating a plurality of respective chunks includes generating a first subset of respective chunks from the plurality of headings and generating a second subset of respective chunks from a combination of both a respective heading and a content portion within the respective heading, and wherein the processor is further configured to provide the plurality of respective chunks for generating a prompt during retrieval augmented generation (RAG) using the generative AI model.

14. The computing system of claim 13, wherein the hierarchical structure associated with the document is a Document Object Model (DOM) associated with the document.

15. The computing system of claim 13, wherein generating the plurality of respective chunks includes:
    determining an average size associated with a plurality of heading levels for the plurality of headings; and generating the plurality of respective chunks using a heading level with an average size that is below the prompt size limitation associated with the prompt.

16. The computing system of claim 13, wherein generating the plurality of respective chunks includes:
generate a markdown representation for each respective chunk including hierarchical context associated with the respective heading.

17. The computer-implemented method of claim 1, wherein generating the plurality of respective chunks includes:
generating a plurality of respective chunk embeddings from the plurality of respective chunks.

* * * * *